United States Patent
Dozier et al.

(10) Patent No.: US 11,865,619 B2
(45) Date of Patent: Jan. 9, 2024

(54) STRUCTURES AND COMPONENTS HAVING COMPOSITE UNIT CELL MATRIX CONSTRUCTION

(71) Applicant: General Electric Company, Schenectady, NY (US)

(72) Inventors: Evan John Dozier, Niskayuna, NY (US); Rajendra Madhukar Kelkar, Mason, OH (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 17/381,361

(22) Filed: Jul. 21, 2021

(65) Prior Publication Data

US 2021/0346956 A1 Nov. 11, 2021

Related U.S. Application Data

(63) Continuation of application No. 15/836,337, filed on Dec. 8, 2017, now Pat. No. 11,097,348.

(51) Int. Cl.
 *B22F 3/11* (2006.01)
 *B22F 3/15* (2006.01)
 (Continued)

(52) U.S. Cl.
 CPC ............ *B22F 3/1115* (2013.01); *B22F 1/052* (2022.01); *B22F 3/156* (2013.01); *B22F 12/44* (2021.01);
 (Continued)

(58) Field of Classification Search
 CPC ............ B22F 3/105–2003/1054; B33Y 10/00
 See application file for complete search history.

(56) References Cited

U.S. PATENT DOCUMENTS

| | | |
|---|---|---|
| 5,079,099 A | 1/1992 | Prewo et al. |
| 5,217,816 A | 6/1993 | Brupbacher et al. |

(Continued)

FOREIGN PATENT DOCUMENTS

| | | |
|---|---|---|
| CN | 101391302 A | 3/2009 |
| EP | 3210703 A1 | 8/2017 |

(Continued)

OTHER PUBLICATIONS

PCT International Search Report and Written Opinion for related application PCT/US2018/060748 dated Jun. 25, 2019; 10 pp.

(Continued)

*Primary Examiner* — Sally A Merkling
*Assistant Examiner* — Sean P. O'Keefe
(74) *Attorney, Agent, or Firm* — Dinsmore & Shohl LLP

(57) ABSTRACT

A structure is provided. The structure defines a first direction, a second direction, and a third direction, the three directions orthogonal to each other. The structure includes a first section, a second section, and a third section. The first section includes a plurality of unit cells joined together, wherein the first section has a first average tensile strength and a first average crack growth resistance. The second substantially solid section is within and surrounding each unit cell of the plurality of first section unit cells, wherein the second section has a second average tensile strength and a second average crack growth resistance, the second average tensile strength different from the first average tensile strength and the second average crack growth resistance different from the first average crack growth resistance. The third section surrounds the first section and the second section.

20 Claims, 8 Drawing Sheets

(51) Int. Cl.
    *B33Y 10/00*         (2015.01)
    *B33Y 80/00*         (2015.01)
    *B22F 1/052*         (2022.01)
    *B22F 10/12*         (2021.01)
    *B22F 10/14*         (2021.01)
    *B22F 10/18*         (2021.01)
    *B22F 10/25*         (2021.01)
    *B22F 10/28*         (2021.01)
    *B33Y 50/02*         (2015.01)
    *B29C 64/153*       (2017.01)
    *G06F 30/17*         (2020.01)
    *G06F 30/23*         (2020.01)
    *B22F 12/44*         (2021.01)

(52) U.S. Cl.
    CPC ............ *B29C 64/153* (2017.08); *B33Y 10/00* (2014.12); *B33Y 50/02* (2014.12); *B33Y 80/00* (2014.12); *G06F 30/17* (2020.01); *G06F 30/23* (2020.01); *B22F 10/12* (2021.01); *B22F 10/14* (2021.01); *B22F 10/18* (2021.01); *B22F 10/25* (2021.01); *B22F 10/28* (2021.01); *B22F 2003/153* (2013.01); *B22F 2301/15* (2013.01); *B22F 2998/10* (2013.01)

(56) References Cited

U.S. PATENT DOCUMENTS

| | | | |
|---|---|---|---|
| 5,543,187 A | 8/1996 | Errico et al. | |
| 6,245,439 B1 | 6/2001 | Yamada et al. | |
| 8,141,317 B1 | 3/2012 | Qiao et ak, | |
| 9,670,572 B2 | 6/2017 | Etter et al. | |
| 2004/0161585 A1 | 8/2004 | Gaitonde | |
| 2011/0135491 A1 | 6/2011 | Shah et al. | |
| 2014/0099476 A1 | 4/2014 | Subramanian et al. | |
| 2014/0228972 A1 | 8/2014 | Xa | |
| 2016/0115822 A1 | 4/2016 | Cortequisse | |
| 2016/0145961 A1 | 5/2016 | Yu et al. | |
| 2016/0279899 A1 | 9/2016 | Cantwell et al. | |
| 2016/0354976 A1 | 12/2016 | Zhang et al. | |
| 2017/0022111 A1 | 1/2017 | Jarvis et al. | |
| 2017/0037928 A1 | 2/2017 | Kronkright et al. | |
| 2017/0120359 A1 | 5/2017 | Carter et al. | |
| 2017/0151724 A1 | 6/2017 | Ender et al. | |
| 2018/0117872 A1 | 5/2018 | Abu Al-Rub | |
| 2019/0151974 A1 | 5/2019 | Blank et al. | |

FOREIGN PATENT DOCUMENTS

| | | | |
|---|---|---|---|
| WO | 2010021899 A1 | 2/2010 | |
| WO | 2015106020 A1 | 7/2015 | |
| WO | 2017060600 A1 | 4/2017 | |
| WO | 2017068300 A1 | 4/2017 | |
| WO | WO-2017093394 A1 * | 6/2017 | ............. B22F 10/20 |
| WO | WO-2017148696 A1 * | 9/2017 | ............. B22F 5/106 |

OTHER PUBLICATIONS

EP Patent Application No. 18885958.1-1103 / 3720684 Extended European Search Report dated Jul. 22, 2021.

* cited by examiner

STRUCTURES AND COMPONENTS HAVING COMPOSITE UNIT CELL MATRIX CONSTRUCTION

CROSS REFERENCE TO RELATED APPLICATIONS

This application is a continuation application of and claims priority to and the benefit of U.S. Nonprovisional application Ser. No. 15/836,337, filed Dec. 8, 2017, the contents of which are hereby incorporated by reference in its entirety.

BACKGROUND

The field of the disclosure relates generally to components, and, more particularly, to components including a composite unit cell matrix cross section to create multifunctional structures within the components with improved strength, fatigue resistance, and load bearing capabilities.

Known components and structures are configured to carry loads and have a service fatigue life. The loads may include, without limitation, mechanical loading, thermal loading, electrical loading, or a combination of types of loading. At least some known components use homogeneous structures composed of a single material that is designed to handle all types of loading. The structures must be designed to handle multiple loads and are often built larger than necessary to handle multiple types of loads while maintaining a sufficient safety factor with regards to factors such as fatigue life, for example, which can result in the component being excessively heavy, bulky, and expensive for a given application. Additionally, additively manufacturing an entire structure can be time intensive and using multiple materials within the structure can increase the difficulty of the additive manufacturing process. Accordingly, it is desirable to incorporate materials having different material properties within a structure that is efficient to manufacture to facilitate creating cost-effective lightweight multifunctional structures with load-bearing and service life characteristics.

BRIEF DESCRIPTION

In one aspect, a structure is provided. The structure defines a first direction, a second direction, and a third direction, the three directions orthogonal to each other. The structure includes a first section, a second section, and a third section. The first section includes a plurality of unit cells joined together, wherein the first section has a first average tensile strength and a first average crack growth resistance. The second substantially solid section is within and surrounding each unit cell of the plurality of first section unit cells, wherein the second section has a second average tensile strength and a second average crack growth resistance, the second average tensile strength different from the first average tensile strength and the second average crack growth resistance different from the first average crack growth resistance. The third section surrounds the first section and the second section.

In another aspect, a component is provided. The component includes a first structure and a second structure. The second structure defines a first direction, a second direction, and a third direction, the three directions orthogonal to each other. The second structure includes a first section, a second section, and a third section. The first section includes a plurality of unit cells joined together, wherein the first section has a first average tensile strength and a first average crack growth resistance. The second substantially solid section is within and surrounding each unit cell of the plurality of first section unit cells, wherein the second section has a second average tensile strength and a second average crack growth resistance, the second average tensile strength different from the first average tensile strength and the second average crack growth resistance different from the first average crack growth resistance. The third section surrounds the first section and the second section.

In yet another aspect, a method of fabricating a composite component is provided. The composite component includes a first material, a second material, and a third material. The method includes depositing the first material and the third material onto a surface. The method also includes operating a consolidating device of an additive manufacturing system to consolidate the first material and the third material using a first process to form a first section and a third section. The first section includes a first material including a plurality of unit cells joined together. The third section includes a third material, the third section surrounding the first section. The method further includes depositing a second material within the third section and within and surrounding each unit cell of the plurality of first section unit cells. The method includes consolidating the second material using a second, consolidation process different from the first process to form a second, substantially solid section within the third section and within and surrounding each unit cell of the plurality of first section unit cells.

DRAWINGS

These and other features, aspects, and advantages of the present disclosure will become better understood when the following detailed description is read with reference to the accompanying drawings in which like characters represent like parts throughout the drawings, wherein.

Figure 1:
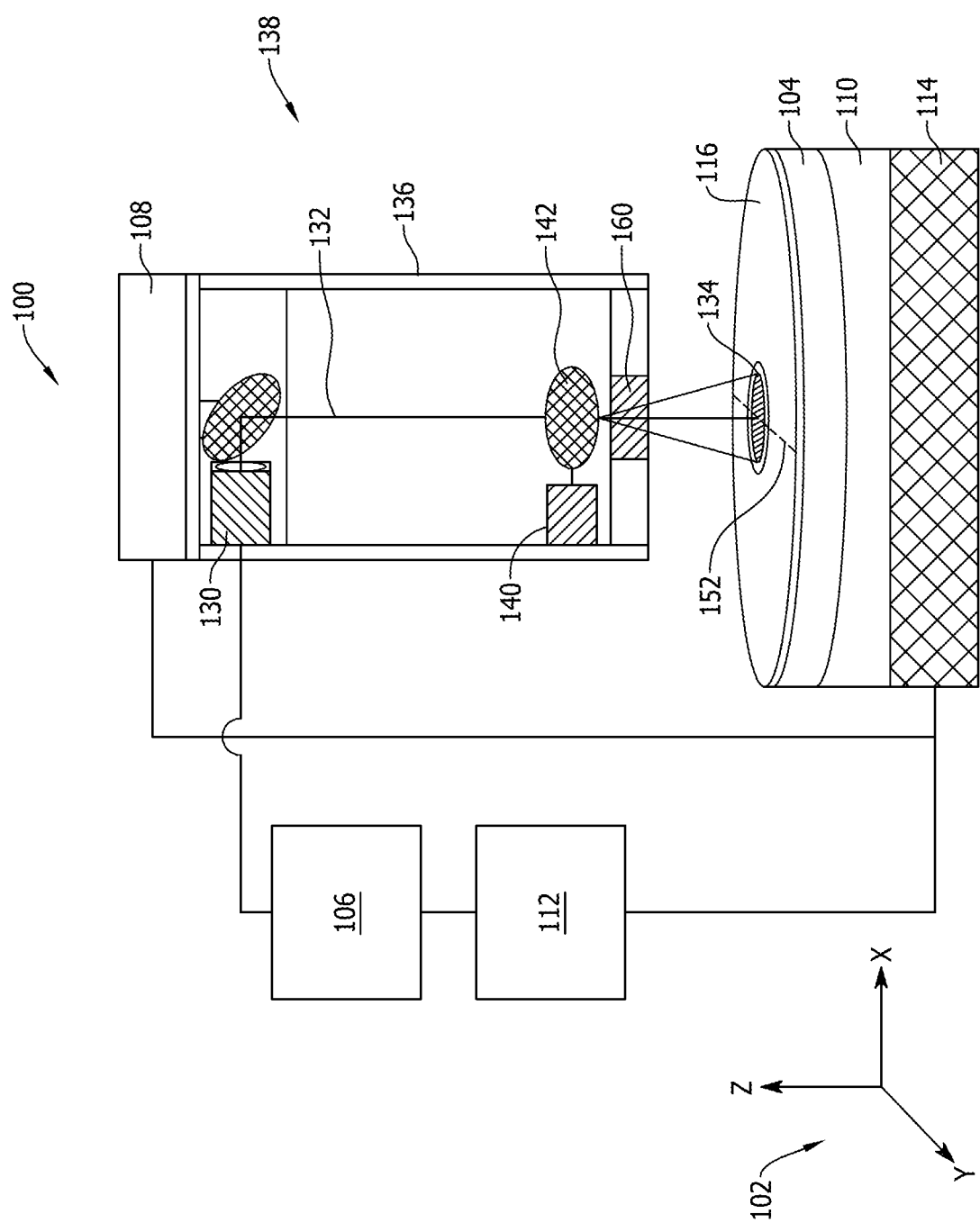
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the term "substantially similar", as used herein throughout the specification and claims, may be applied to modify any quantitative representation within a range of five percent of the referenced quantitative representation, and more particularly, within a range of one percent of the referenced quantitative representation. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "tensile strength" refers to the amount of tensile stress that a material can withstand before breaking or failing. Accordingly, the tensile strength of a material represents the material's resistance to plastic-type deformation when subjected to loading. The tensile strength of the material may be calculated by dividing the tensile stress the material was exposed to at the time of failure by the original cross-sectional area of the material. Moreover, as used herein, the term "crack growth resistance" refers to a material's resistance to propagation of a crack through the material, such that the greater the crack growth resistance, the more resistant the material is to propagation of the crack through the material.

The embodiments described herein facilitate manufacturing a component including a multifunctional composite unit cell matrix structure having improved load-bearing and service life characteristics for its intended application. The composite unit cell matrix structure includes a first section, a second section, and a third section. The first section includes a plurality of unit cells joined together, wherein the first section has a first average tensile strength and a first average crack growth resistance. The second substantially solid section is within and surrounding each unit cell of the plurality of first section unit cells, wherein the second section has a second average tensile strength and a second average crack growth resistance, the second average tensile strength different from the first average tensile strength and the second average crack growth resistance different from the first average crack growth resistance. The third section surrounds the first section and the second section. Generally, a monolithic (i.e. single piece) structure that is subject to multiple loads will experience deformation and/or material property changes in a manner consistent with the cumulative loading. This loading may include, without limitation, mechanical, thermal, and electrical loading. However, when unit cells are arranged as part of a composite unit cell matrix structure, the different sections within the structure facilitate the structure carrying varying types of loading without compromising strength or crack growth resistance, for example, to account for only one type of loading. Additionally, manufacturing a composite unit cell matrix structure facilitates rapid and cost efficient manufacturing of components with improved load-bearing and service life characteristics as only a relatively small first section of the component is of complex geometry.

Additive manufacturing processes and systems include, for example, and without limitation, vat photopolymerization, powder bed fusion, binder jetting, material jetting, cold spraying, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, DMLM—Direction Metal Laser Melting, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Additional non-additive consolidation processes and systems include, for example, and without limitation, hot isostatic pressing, cold isostatic pressing, die pressing, shock/dynamic consolidation, and magnetic compaction. These additional processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 100. A coordinate system 102 includes an x-axis, a y-axis, and a z-axis. In the exemplary embodiment, additive manufacturing system 100 includes a consolidating device 138 including a laser device 130, a scanning motor 140, a scanning mirror 142, and a scanning lens 160 for fabricating a component 104 using a layer-by-layer manufacturing process. Alternatively, consolidating device 138 may include any component that facilitates consolidation of a material using any of the processes and systems described herein. Laser device 130 provides a high-intensity heat source configured to generate a melt pool 134 (not shown to scale) in a powdered material using an energy beam 132. Laser device 130 is contained within a housing 136 that is coupled to a mounting system 108. Additive manufacturing system 100 also includes a computer control system, or controller 106. Mounting system 108 is moved by an actuator or an actuator system 112 that is configured to move mounting system 108 in an XY plane to cooperate with scanning mirror 142 to facilitate fabricating a layer of component 104 within additive manufacturing system 100. For example, and without limitation, mounting system 108 is pivoted about a central point, moved in a linear path, a curved path, and/or rotated to cover a portion of the powder on powder bed 110 to facilitate directing energy beam 132 along the surface of component 104. Alternatively, housing 136 and energy beam 132 are moved in any orientation and manner that enables additive manufacturing system 100 to function as described herein.

Scanning motor 140 is controlled by controller 106 and is configured to move mirror 142 such that energy beam 132 is reflected to be incident along a predetermined path along powder bed 110, such as, for example, and without limitation, a linear and/or rotational scan path 152. In the exemplary embodiment, the combination of scanning motor 140 and scanning mirror 142 forms a two-dimension scan galvanometer. Alternatively, scanning motor 140 and scanning mirror 142 may include a three-dimension (3D) scan galvanometer, dynamic focusing galvanometer, and/or any other method that may be used to deflect energy beam 132 of laser device 130.

In the exemplary embodiment, powder bed 110 is mounted to a support structure 114, which is moved by actuator system 112. As described above with respect to mounting system 108, actuator system 112 is also configured to move support structure 114 in a Z direction (i.e., normal to a top surface of powder bed 110). In some embodiments, actuator system 112 is also configured to move support structure 114 in the XY plane. For example, and without limitation, in an alternative embodiment where housing 136 is stationary, actuator system 112 moves support structure 114 in the XY plane to cooperate with scanning motor 140 and scanning mirror 142 to direct energy beam 132 of laser device 130 along scan path 152 about powder bed 110. In the exemplary embodiment, actuator system 112 includes, for example, and without limitation, a linear motor(s), a hydraulic and/or pneumatic piston(s), a screw drive mechanism(s), and/or a conveyor system.

In the exemplary embodiment, additive manufacturing system 100 is operated to fabricate component 104 from a computer modeled representation of the 3D geometry of component 104. The computer modeled representation may be produced in a computer aided design (CAD) or similar file. The CAD file of component 104 is converted into a layer-by-layer format that includes a plurality of build parameters for each layer of component 104, for example, build layer 116 of component 104. In the exemplary embodiment, component 104 is modeled in a desired orientation relative to the origin of the coordinate system used in additive manufacturing system 100. The geometry of component 104 is sliced into a stack of layers of a desired thickness, such that the geometry of each layer is an outline of the cross-section through component 104 at that particular layer location. Scan paths 152 are generated across the geometry of a respective layer. The build parameters are applied along scan path 152 to fabricate that layer of component 104 from the material used to construct component 104. The steps are repeated for each respective layer of component 104 geometry. Once the process is completed, an electronic computer build file (or files) is generated, including all of the layers. The build file is loaded into controller 106 of additive manufacturing system 100 to control the system during fabrication of each layer.

After the build file is loaded into controller 106, additive manufacturing system 100 is operated to generate component 104 by implementing the layer-by-layer manufacturing process, such as a direct metal laser melting method. The exemplary layer-by-layer additive manufacturing process does not use a pre-existing article as the precursor to the final component, rather the process produces component 104 from a raw material in a configurable form, such as a powder. For example, and without limitation, a steel component can be additively manufactured using a steel powder. Additive manufacturing system 100 enables fabrication of components, such as component 104, using a broad range of materials, for example, and without limitation, metals, ceramics, glass, and polymers.

Figure 2:
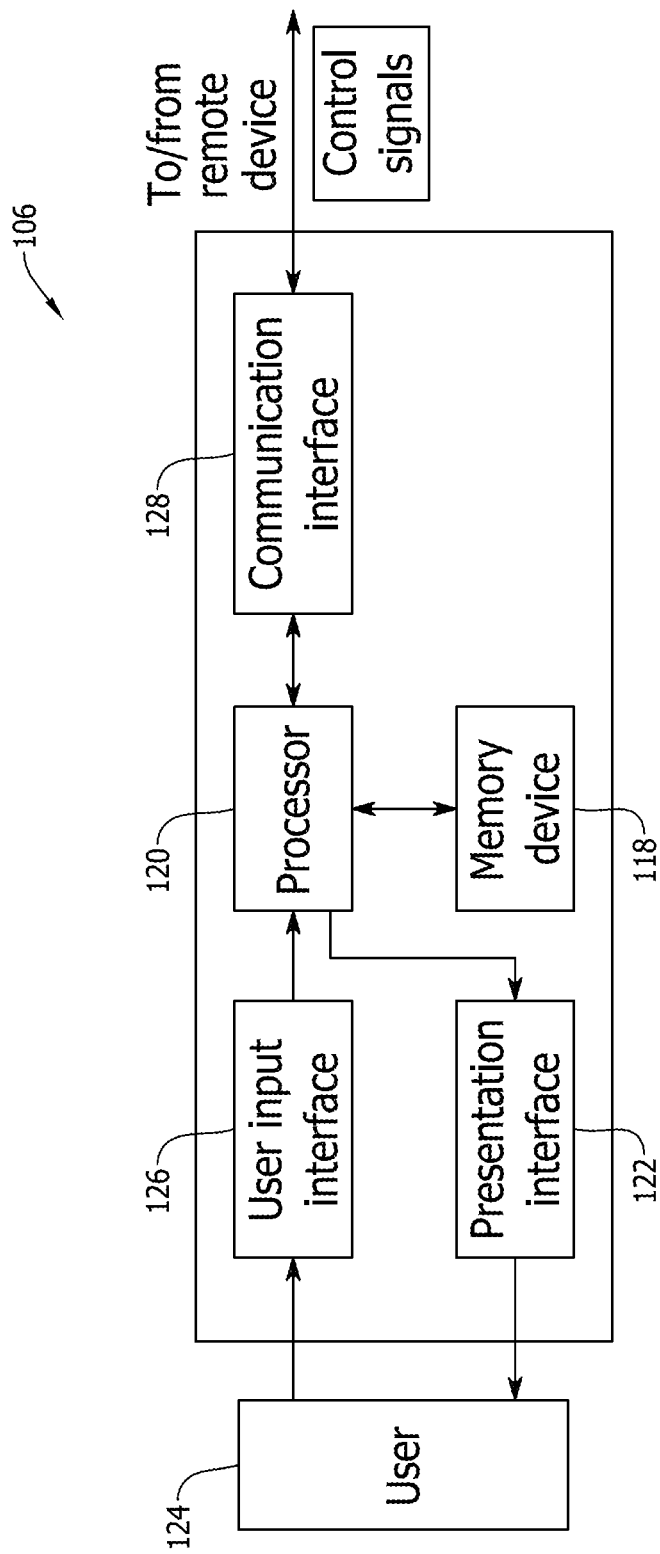
FIG. 2 is a block diagram of a controller that is used to operate the additive manufacturing system shown in FIG. 1.

FIG. 2 is a block diagram of controller 106 that is used to operate additive manufacturing system 100 (shown in FIG. 1). In the exemplary embodiment, controller 106 is any type of controller typically provided by a manufacturer of additive manufacturing system 100 to control operation of additive manufacturing system 100. Controller 106 executes operations to control the operation of additive manufacturing system 100 based at least partially on instructions from human operators. Controller 106 includes, for example, a 3D model of component 104 to be fabricated by additive manufacturing system 100. Operations executed by controller 106 include controlling power output of laser device 130 (shown in FIG. 1) and adjusting mounting system 108 and/or support structure 114, via actuator system 112 (all shown in FIG. 1) to control the scanning velocity of energy beam 132. Controller 106 is also configured to control scanning motor 140 to direct scanning mirror 142 to further control the scanning velocity of energy beam 132 within additive manufacturing system 100. In alternative embodiments, controller 106 may execute any operation that enables additive manufacturing system 100 to function as described herein.

In the exemplary embodiment, controller 106 includes a memory device 118 and a processor 120 coupled to memory device 118. Processor 120 may include one or more processing units, such as, without limitation, a multi-core configuration. Processor 120 is any type of processor that permits controller 106 to operate as described herein. In some embodiments, executable instructions are stored in memory device 118. Controller 106 is configurable to perform one or more operations described herein by programming processor 120. For example, processor 120 may be programmed by encoding an operation as one or more executable instructions and providing the executable instructions in memory device 118. In the exemplary embodiment, memory device 118 is one or more devices that enable storage and retrieval of information such as executable instructions or other data. Memory device 118 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 118 may be configured to store any type of data, including, without limitation, build parameters associated with component 104. In some embodiments, processor 120 removes or "purges" data from memory device 118 based on the age of the data. For example, processor 120 may overwrite previously recorded and stored data associated with a subsequent time or event. In addition, or alternatively, processor 120 may remove data that exceeds a predetermined time interval. In addition, memory device 118 includes, without limitation, sufficient data, algorithms, and commands to facilitate monitoring of build parameters and the geometric conditions of component 104 being fabricated by additive manufacturing system 100.

In some embodiments, controller 106 includes a presentation interface 122 coupled to processor 120. Presentation interface 122 presents information, such as the operating conditions of additive manufacturing system 100, to a user 124. In one embodiment, presentation interface 122 includes a display adapter (not shown) coupled to a display device (not shown), such as a cathode ray tube (CRT), a liquid crystal display (LCD), an organic LED (OLED) display, or an "electronic ink" display. In some embodiments, presentation interface 122 includes one or more display devices. In addition, or alternatively, presentation interface 122 includes an audio output device (not shown), for example, without limitation, an audio adapter or a speaker (not shown).

In some embodiments, controller 106 includes a user input interface 126. In the exemplary embodiment, user input interface 126 is coupled to processor 120 and receives input from user 124. User input interface 126 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 122 and user input interface 126.

In the exemplary embodiment, a communication interface 128 is coupled to processor 120 and is configured to be coupled in communication with one or more other devices, such as laser device 130, and to perform input and output operations with respect to such devices while performing as an input channel. For example, communication interface 128 may include, without limitation, a wired network adapter, a wireless network adapter, a mobile telecommunications adapter, a serial communication adapter, or a parallel communication adapter. Communication interface 128 may receive a data signal from or transmit a data signal to one or more remote devices. For example, in some embodiments, communication interface 128 of controller 106 may transmit/receive a data signal to/from actuator system 112.

Presentation interface 122 and communication interface 128 are both capable of providing information suitable for use with the methods described herein, such as, providing information to user 124 or processor 120. Accordingly, presentation interface 122 and communication interface 128 may be referred to as output devices. Similarly, user input interface 126 and communication interface 128 are capable of receiving information suitable for use with the methods described herein and may be referred to as input devices.

Figure 3:
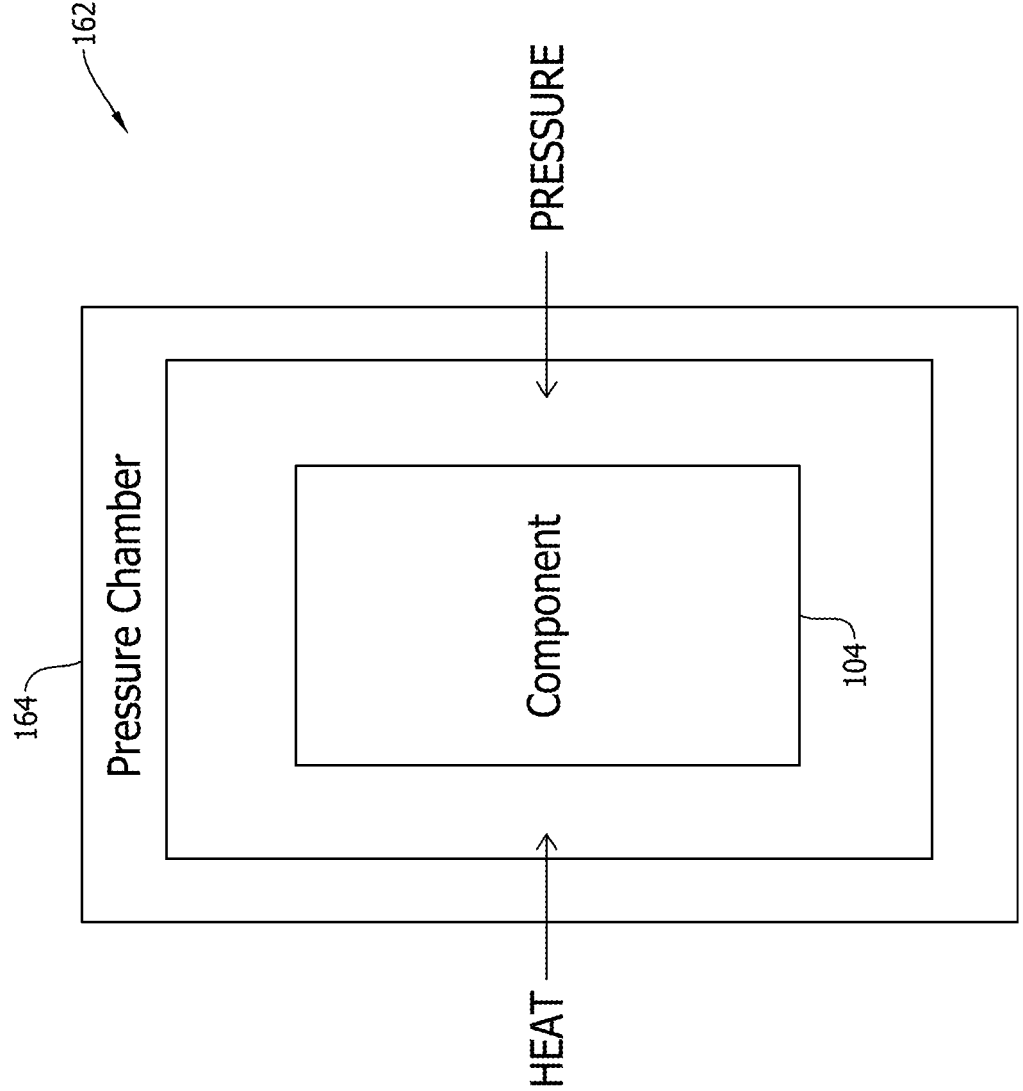
FIG. 3 is a block diagram of a hot isostatic press system.

FIG. 3 is a block diagram of a hot isostatic press (HIP) system 162. In the exemplary embodiment, HIP system 162 includes a pressure chamber 164, into which component 104, heat, an inert gas, and pressure are introduced. In the exemplary embodiment, argon is introduced into pressure chamber 164 until a set pressure within pressure chamber 164 is reached, resulting in a corresponding increase in the temperature within pressure chamber 164. In alternative embodiments, any type of gas that facilitates operation of HIP system 162 as described herein. Heat is introduced into pressure chamber 164 to further raise the temperature within pressure chamber 164 until the desired operational temperature and pressure is reached. The pressure within pressure chamber 164 facilitates uniform, isostatic application of force to component 104 by the inert gas.

In the exemplary embodiment, at least a first portion of component 104 is fabricated from a first material using additive manufacturing system 100 as described herein. A second material in the form of a powder and having an initial grain size is introduced into the voids of component 104 that were intentionally kept open as part of the build process before placing component 104 into pressure chamber 164. Isostatic pressure and elevated heat are applied to component 104, causing the powder to consolidate and form a second portion of component 104. The resulting second portion of component 104 possesses relatively larger grain sizes with an improved resistance to crack growth as a result of the HIP process. Additionally, the mechanical and physical properties of the first portion of component 104 may be improved by the HIP process, which facilitates the elimination of voids and other defects in the first portion of component 104 by encouraging further bonding amongst the material of the first portion of component 104. In an alternative embodiment, the second material is introduced into the voids of component 104 using an additive manufacturing process, for example, cold spraying. In other alternative embodiments, the second material may be the same material as the first material to yield a single material component with non-homogenous mechanical properties. In a further alternative embodiment, non-consolidated first material remaining within component 104 following the additive manufacturing process is consolidated by HIP system 162 to form the second portion of component 104. In yet another alternative embodiment, only an outer section of the first portion of component 104 is consolidated using additive manufacturing system as described herein, and any non-consolidated material remaining within an inner section of the first portion of component 104 is consolidated by HIP system 162.

Figure 4:
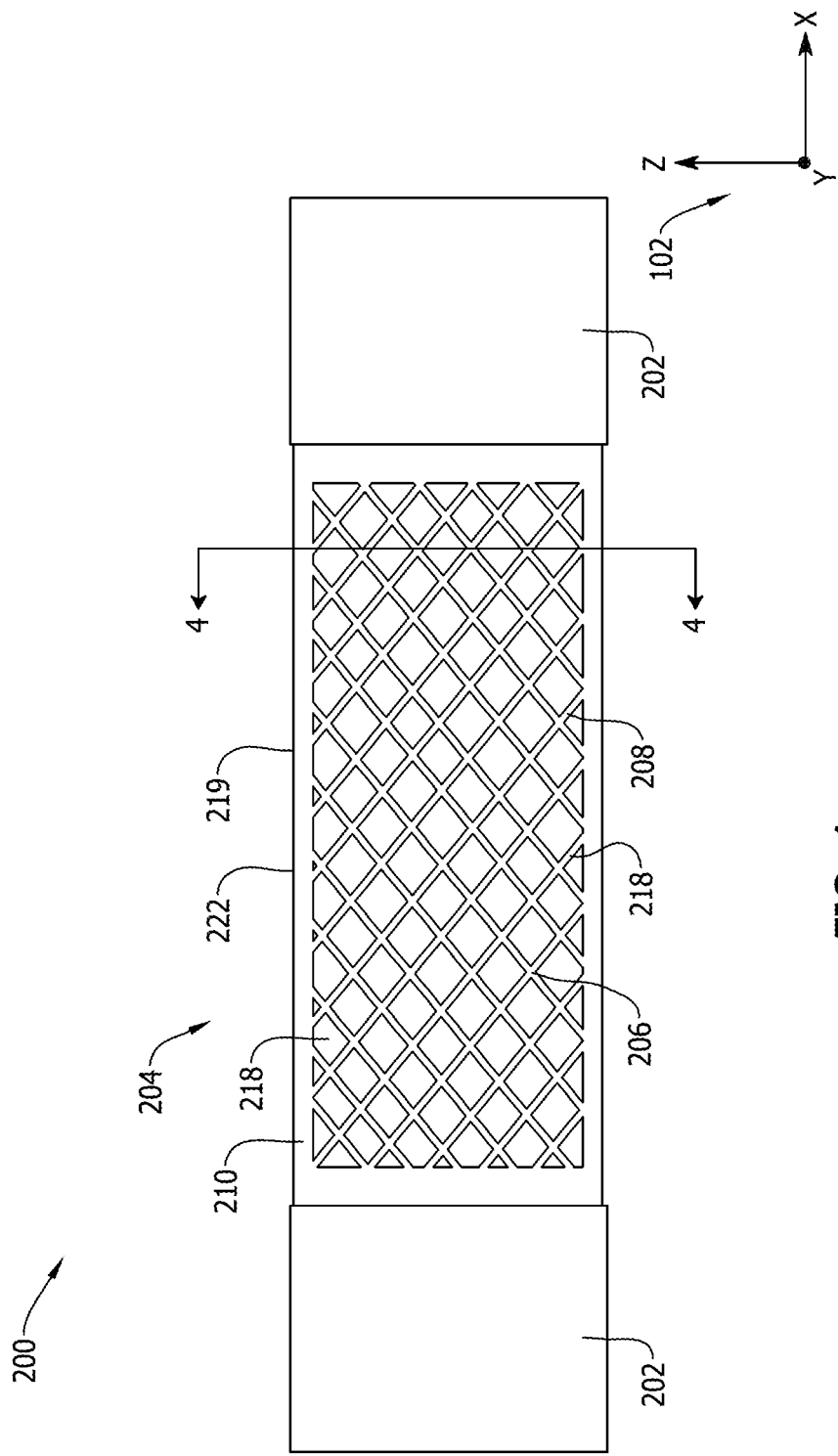
FIG. 4 is a side view of a component with a solid structure section and an exemplary composite unit cell matrix structure section.
Figure 5:
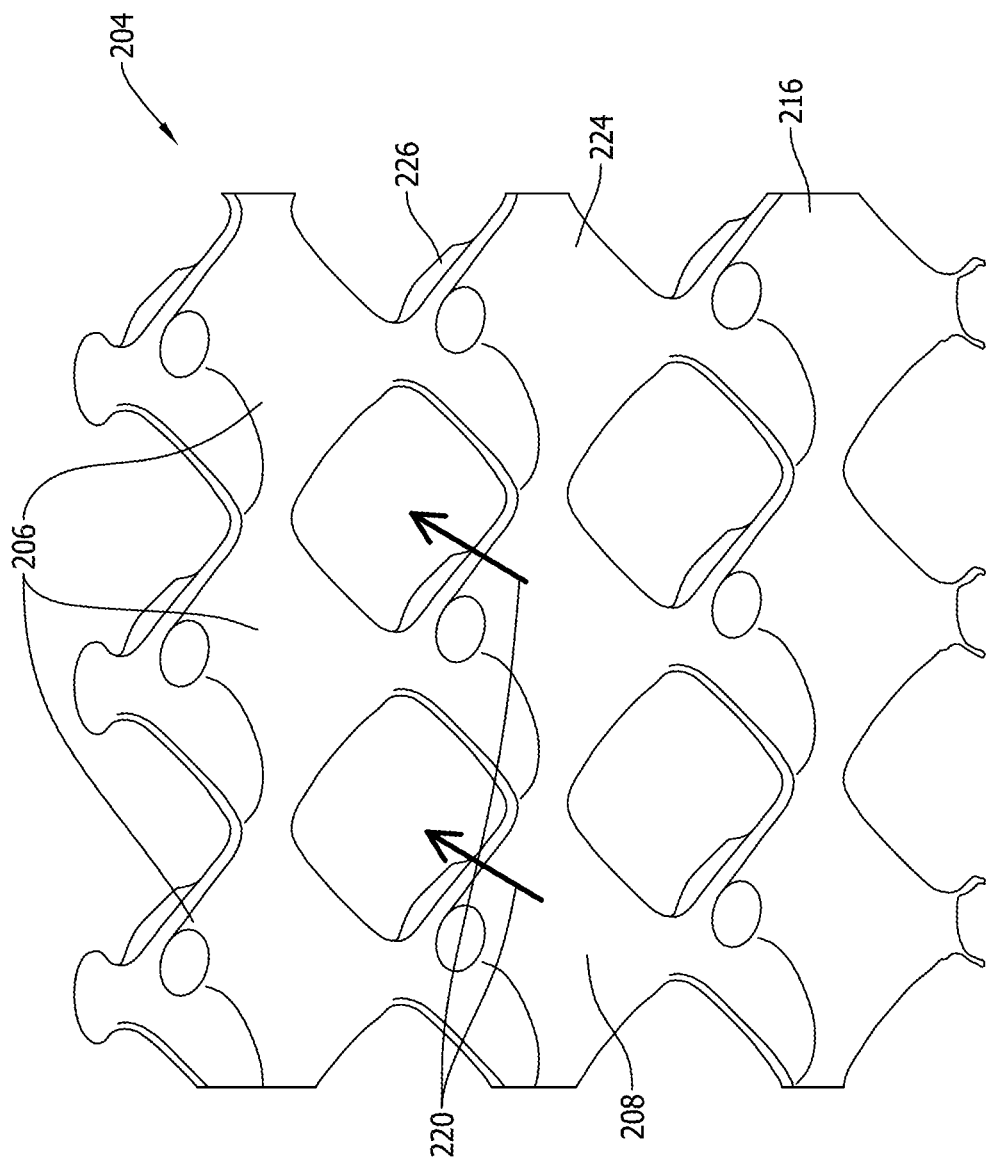
FIG. 5 is a section view of an exemplary first section of the composite unit cell matrix structure shown in FIG. 4 taken about section line 4-4.

FIG. 4 is a side view of a component 200 including a first, solid structure portion 202 and an exemplary second, composite unit cell matrix structure 204. FIG. 5 is a section view of an exemplary first section 208 of composite unit cell matrix structure 204 (shown in FIG. 4) taken about section line 4-4. In the exemplary embodiment, second, composite unit cell matrix structure 204 is coupled to first structure 202 and facilitates inclusion of a composite unit cell matrix structure into component 200 that has improved fatigue resistance and load bearing abilities. In alternative embodiments, component 200 may include any number and type of structures as enables component 200 to function as described herein.

In the exemplary embodiment, second structure 204 includes first section 208, a second section 210, and a third section 222. First section 208 is a first material 216 and includes a plurality of unit cells 206 joined together. Second section 210 is a second material 218 and includes a plurality of substantially solid portions. Third section 222 is a third material 219 and surrounds first section 208 and second section 210. The plurality of substantially solid portions of second section 210 are within and surrounding each unit cell 206 of the plurality of first section 208 unit cells 206 and substantially fills the volume within and surrounding the plurality of unit cells 206 and the volume between the plurality of unit cells 206 and third section 222.

In the exemplary embodiment, first material 216 is an alloy-steel and first section 208 has a first average tensile strength and a first average crack growth resistance. Second material 218 is an aluminum alloy having a greater ductility relative to first material 216, and second section 210 has a second average tensile strength and a second average crack growth resistance. Third material 219 is an alloy-steel and third section 222 has a third average tensile strength and a third average crack growth resistance. In the exemplary embodiment, the second average tensile strength of second section 210 is less than the first average tensile strength of first section 208 and the third average tensile strength of third section 222 is greater than the first average tensile strength of first section 208. The combination of first section 208, second section 210, and third section 222 to form second structure 204 yields a resulting structure that exhibits high tensile strength, low weight, and high thermal and electric conductivity. Additionally, for example, and without limitation, additively manufacturing a particular section of second structure 204 using a DMLM or other laser-type process may facilitate creation of material properties within the section that result from molecular migration within the material due to the melting process. In an alternative embodiment, first material 216 and third material 219 are a tungsten alloy and second material 218 is one of a cobalt alloy, a nickel alloy, and an iron alloy. In alternative embodiments, first section 208, second section 210, and third section 222 may be formed from any material that facilitates operation of component 200 as described herein.

In the exemplary embodiment, first material 216 and second material 218 are functionally graded within component 200. More specifically, first material 216 of first section 208 has a microstructure that varies along at least one of the X-direction, the Y-direction, and the Z-direction within first section 208, and second material 218 of second section 210 has a microstructure that varies along at least one of the X-direction, the Y-direction, and the Z-direction within second section 210. In the exemplary embodiment, first material 216 within first section 208 and second material 218 within second section 210 are functionally graded to facilitate creating directional and/or local properties within component 200 to facilitate optimizing component 200 for the loading and environmental conditions component 200 will be exposed to during use. In an alternative embodiment, third material 219 of third section 222 may have a microstructure that varies along at least one of the X-direction, the Y-direction, and the Z-direction within third section 222. In other alternative embodiments, first section 208, second section 210, and third section 222 may be functionally graded in any way that facilitates operation of component 200 as described herein.

In the exemplary embodiment, second section 210 and third section 222 of second structure 204 are coupled to first structure 202, and second section 210 is coupled to third section 222. In an alternative embodiment, first section 208, second section 210, and third section 222 may be coupled to more than one structure. In another alternative embodiment, a plurality of mesh structures may extend through at least a portion of at least one of first section 208, second section 210, and third section 222, and may include, for example, a metal material mesh, a ceramic material mesh, and a composite material mesh. The mesh may be an interlaced structure that is configured and located within component 200 to facilitate improving at least one of the tensile strength and the crack growth resistance of component 200, and that is placed in the desired location within component 200 during the additive manufacturing process. In other alternative embodiments, first section 208, second section 210, and third section 222 may be coupled to any number of structures as enables component 200 to function as described herein.

In the exemplary embodiment, first section 208 and third section 222 are fabricated using a first, additive manufacturing process, as is described herein. Second section 210 is fabricated using a HIP consolidation process. In alternative embodiments, second section 210 is fabricated using at least one of hot pressing, electric current assisted sintering, cold isostatic pressing, dynamic consolidation, and magnetic compaction. During fabrication of section 210, the walls of third section 222 are compressed inwardly as second material 218 is consolidated. In an alternative embodiment, the walls of third section 222 are compressed inwardly during fabrication of section 210 such that at least a portion of the walls are in contact with and become coupled to at least a portion of first section 208. In another alternative embodiment, first section 208, second section 210, and third section 222 may be heat treated at any step in the manufacturing process to facilitate each section having differing material properties. In further alternative embodiments, first section 208, second section 210, and third section 222 may be fabricated using any process that enables operation of component 200 as described herein.

In the exemplary embodiment, each unit cell 206 of the plurality of unit cells 206 of first section 208 has a substantially continuous inner wall 224 and a substantially continuous outer wall 226, each inner wall 224 joined to at least one inner wall 224 of an adjacent unit cell 206, and each outer wall 226 joined to at least one outer wall 226 of an adjacent unit cell 206. In an alternative embodiment, first section 208 includes the plurality of unit cells 206 arranged as a lattice structure. In a further alternative embodiment, first section 208 includes a plurality of lattice structure unit cells 206, wherein each lattice unit cell 206 has a lattice shape of at least one of triclinic, monoclinic, orthorhombic, tetragonal, hexagonal, cubic, and spherical. In other alternative embodiments, first section 208 includes a plurality of unit cells 206 having a beam structure. In yet another alternative embodiment, first section 208 includes any arrangement of unit cells 206 that enables component 200 to function as described herein.

In the exemplary embodiment, second material 218 of second section 210 is sized and shaped to interface with each inner wall 224 and each outer wall 226 of each unit cell 206 of first section 208 and to substantially fill a plurality of inter-cellular passages 220. In alternative embodiments, second section 210 may fill only a portion of inter-cellular passages 220. In other alternative embodiments, second section 210 may occupy any portion of second structure 204 that enables operation of component 200 as described herein.

Figure 6:
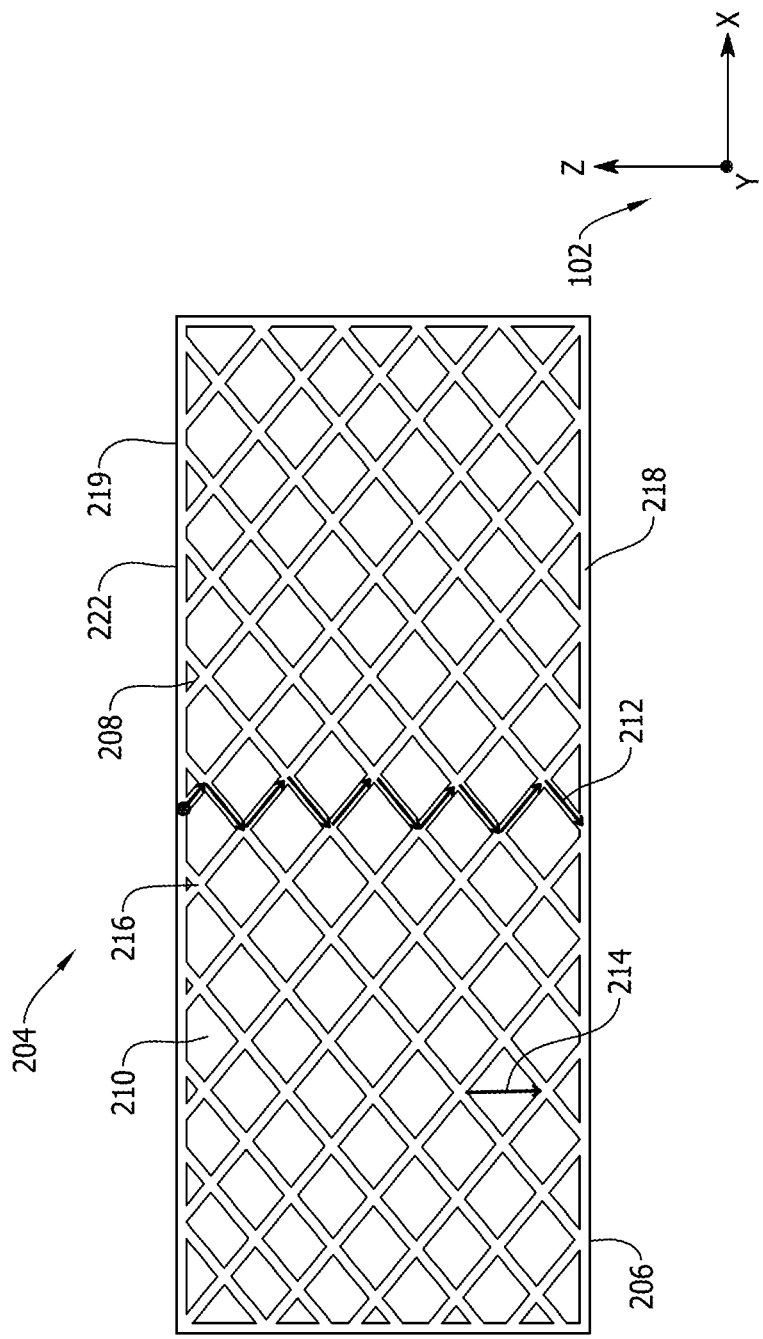
FIG. 6 is a side view of the composite unit cell matrix structure shown in FIG. 3 illustrating an exemplary first crack propagation pathway and an exemplary second crack propagation pathway.

FIG. 6 is a side view of second, composite unit cell matrix structure 204 (shown in FIG. 3) illustrating an exemplary first crack propagation pathway 212 and an exemplary second crack propagation pathway 214. First crack propagation pathway 212 lies along portions of the perimeter of adjacent and coupled unit cells 206 of first section 208 and represents a first potential failure path for second structure 204. Second crack propagation pathway 214 represents the path of least distance a crack could travel to propagate through second structure 204. In the exemplary embodiment, first material 216 of first section 208 and third material 219 of third section 222 have relatively smaller grain sizes and exhibit relatively higher tensile strengths, improved low-cycle fatigue, and higher relative hardnesses as a result of the additive manufacturing process. Second material 218 of second section 210 has a relatively large grain size and exhibits relatively greater crack growth resistance and creep strength than first material 216 of first section 208 and third material 219 of third section 222 as a result of the HIP process. In alternative embodiments, first material 216, second material 218, and third material 219 may be any material and have any tensile strength, low-cycle fatigue, and hardness that facilitates operation of composite unit cell matrix structure 204 as described herein.

In the exemplary embodiment, with reference to FIG. 6, a crack initiating in third section 222 of second structure 204 is illustrated as propagating through second section 210 and first section 208 along first crack propagation pathway 212. More specifically, due to one of a plurality of factors, including, without limitation, surface finish imperfections, low cycle fatigue failure, and mechanical notching of the surface, a crack may travel from one side of second structure 204 to the opposite side of second structure 204 through unit cells 206 of first section 208. Propagation of the crack along first crack propagation pathway 212 is inhibited by the complex and tortuous pathway that the crack must follow as it progresses through each unit cell 206. The crack is also inhibited from following a straight line between the crack initiation point and the crack termination point on the opposite side of second structure 204 by the presence of second material 218 of second section 210 which has a higher resistance to the crack failure modes for reasons discussed herein.

In the exemplary embodiment, a crack initiating in second section 210 of second structure 204 is illustrated as propagating along second crack propagation pathway 214 through a portion of second section 210 that lies within a unit cell 206 of first section 208. Initiation of a cracking-type failure mode within second material 218 of second section 210 is less common because of the relatively greater crack growth resistance and increased grain size of second section 210, as compared to first material 216 of first section 208 and third material 219 of third section 222, due to solid section's 210 material properties resulting from the HIP consolidation process. The crack following second crack propagation pathway 214 through second section 210 is inhibited from propagating through second structure 204 by unit cells 206 of first section 208. Additionally, further propagation of the crack along second crack propagation pathway 214 in a straight-line path through unit cells 206 is further inhibited by the portion of second section 210 positioned on the side of each unit cell 206 immediately opposite the portion of second section 210 in which the crack initiated. Cracking-type failure resulting from low-cycle fatigue, among other failure modes, is inhibited by the composite unit cell matrix structure of second structure 204.

Figure 7:
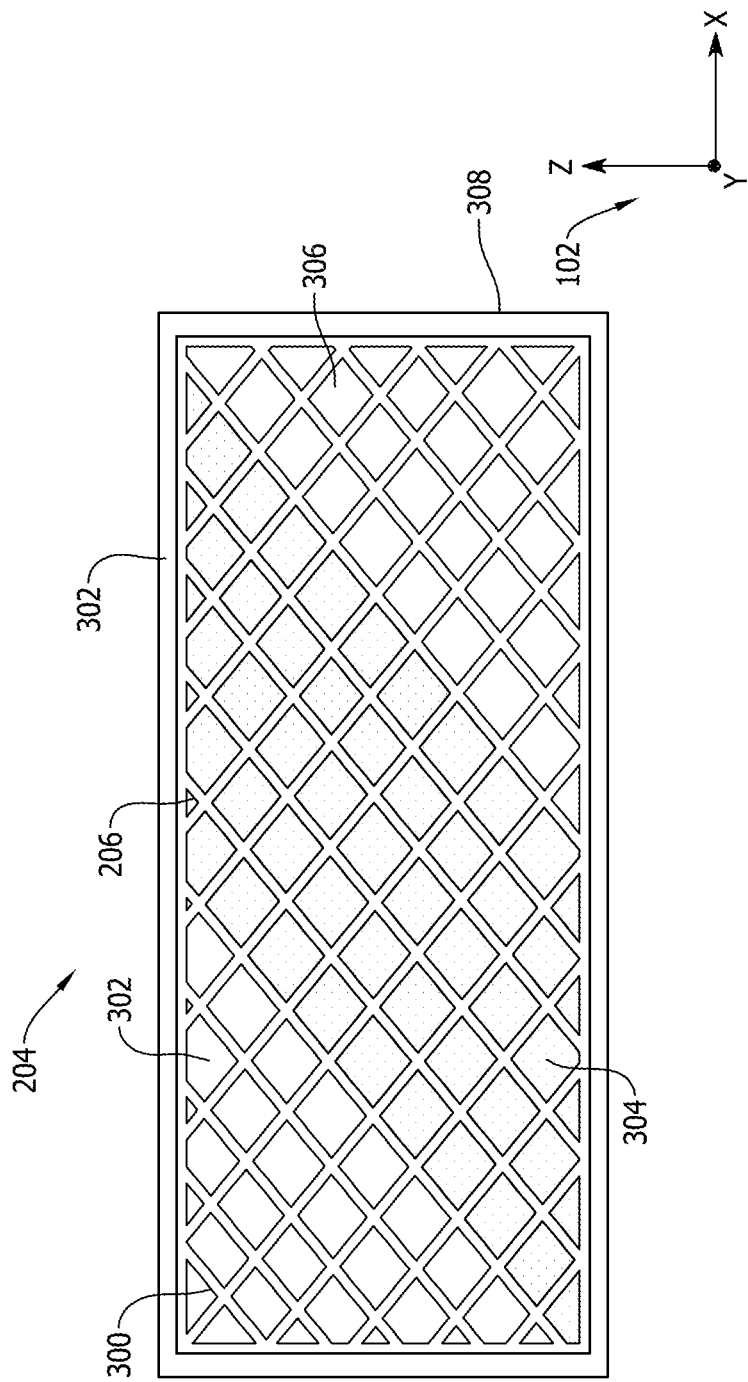
FIG. 7 is a side view of an alternative embodiment of the composite unit cell matrix structure shown in FIG. 3.

FIG. 7 is a side view of an alternative embodiment of composite unit cell matrix structure 204 (shown in FIG. 4) illustrating a first section 300, a second section 302, a third section 304, a fourth section 306, and a fifth section 308. The embodiment shown in FIG. 7 is substantially identical to the embodiment shown in FIG. 4, except composite unit cell matrix structure 204 includes five sections: first, unit cell section 300, second section 302, third section 304, fourth section 306, and fifth section 308. In the exemplary embodiment, first section 300 is a first material, second section 302 is a second material, third section 304 is a third material, fourth section 306 is a fourth material, and fifth section 308 is a fifth material, each material different from the other materials. Using multiple materials within composite unit cell matrix structure 204 facilitates varying physical properties within composite unit cell matrix structure 204 and component 200 to accommodate, for example, and without limitation, in-service loading, structural requirements, and service life design criteria. In alternative embodiments, composite unit cell matrix structure 204 may include any number, type, and configuration of internal sections that enables component 200 to function as described herein.

Figure 8:
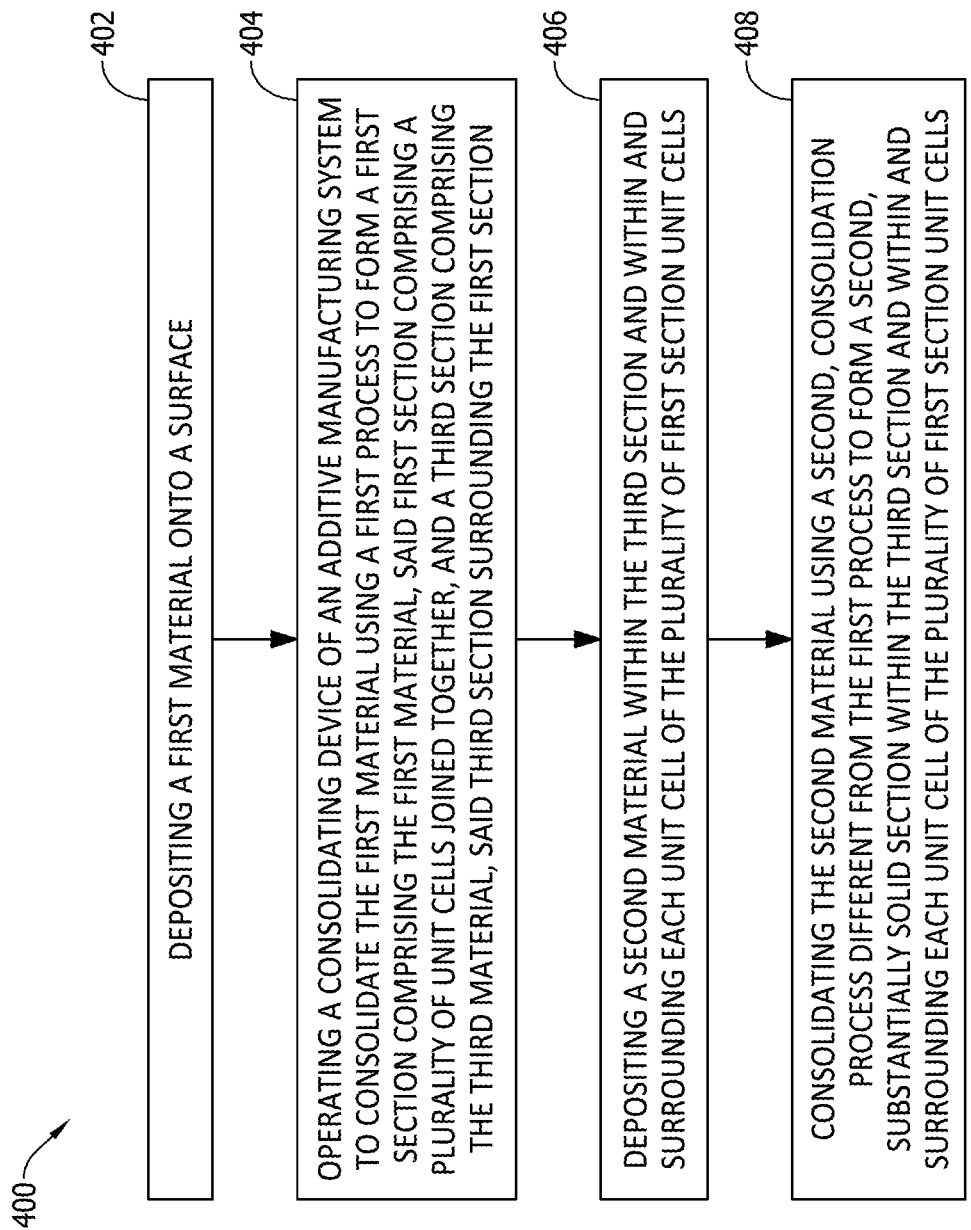
FIG. 8 is a flow chart illustrating a method for fabricating a component having a composite unit cell matrix portion.

FIG. 8 is a flow chart illustrating a method 400 for fabricating composite component 104 having a composite unit cell matrix structure. Component 104 includes a first material 216, a second material 218, and a third material 219. Referring to FIGS. 1-7, method 400 includes depositing 402 first material 216 and third material 219 onto a surface. Method 400 also includes operating 404 a consolidating device 138 of an additive manufacturing system 100 to consolidate first material 216 and third material 219 using a first process to form a first section 208 comprising first material 216 comprising a plurality of unit cells 206 joined together, and a third section 222 comprising third material 219, third section 222 surrounding first section 208. Method 400 further includes depositing 406 a second material 218 within third section 222 and within and surrounding each unit cell 206 of the plurality of first section 208 unit cells 206. Method 400 includes consolidating 408 second material 218 using a second, consolidation process different from the first process to form a second, substantially solid section 210 within third section 222 and within and surrounding each unit cell 206 of the plurality of first section 208 unit cells 206.

The above-described unit cell structures provide an efficient method for fabricating multifunctional composite unit cell matrix structures having improved load-bearing and service life characteristics for their intended applications. Specifically, the composite unit cell matrix structure includes a first section, a second section, and a third section. The first section includes a plurality of unit cells joined together, wherein the first section has a first average tensile strength and a first average crack growth resistance. The second substantially solid section is within and surrounding each unit cell of the plurality of first section unit cells, wherein the second section has a second average tensile strength and a second average crack growth resistance, the second average tensile strength different from the first average tensile strength and the second average crack growth resistance different from the first average crack growth resistance. The third section surrounds the first section and the second section. Generally, a monolithic (i.e. single piece) structure that is subject to multiple loads will experience deformation and/or material property changes in a manner consistent with the cumulative loading. This loading may include, without limitation, mechanical, thermal, and electrical loading. However, when unit cells are arranged as part of a composite unit cell matrix structure, the different sections within the structure facilitate the structure carrying varying types of loading without compromising strength or crack growth resistance, for example, to account for only one type of loading. Additionally, manufacturing a composite unit cell matrix structure facilitates rapid and cost efficient manufacturing of components with improved load-bearing and service life characteristics as only a relatively small first section of the component is of complex geometry.

An exemplary technical effect of the methods, systems, and apparatus described herein includes at least one of: (a) replacing at least a portion of the solid structure of a component with a multifunctional composite unit cell matrix structure; (b) creating a component with improved load bearing and failure resistance properties and characteristics; (c) decreasing the time required to manufacture a multifunctional composite unit cell matrix structure; and (d) reducing the cost to manufacture a multifunctional composite unit cell matrix structure.

Exemplary embodiments of a multifunctional composite unit cell matrix structure having improved load-bearing and service life characteristics are described above in detail. The multifunctional composite unit cell matrix structures, and methods of fabricating components including such structures are not limited to the specific embodiments described herein, but rather, components of systems and/or steps of the methods may be utilized independently and separately from other components and/or steps described herein. For example, the methods may also be used in combination with other components which require a multifunctional composite unit cell matrix structure having improved load-bearing and service life characteristics, and are not limited to practice with only the systems and methods as described herein. Rather, the exemplary embodiment may be implemented and utilized in connection with many other manufacturing or construction applications that require multifunctional composite unit cell matrix structures having improved load-bearing and service life characteristics.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of fabricating a composite component, the composite component comprising a first material, a second material, and a third material, said method comprising:
depositing the first material and the third material onto a surface; and
operating a consolidating device of an additive manufacturing system to consolidate the first material and the third material using a first process to form:
a first section comprising the first material, said first section comprising a plurality of first section unit cells joined together;
a third section comprising the third material, said third section surrounding the first section; and
depositing the second material within the third section and within and surrounding each unit cell of the plurality of first section unit cells; and
consolidating the second material using a second consolidation process different from the first process to form a second, solid section within the third section and within and surrounding each unit cell of the plurality of first section unit cells;
wherein the first material and the third material are harder than the second material, and the first material and the third material have a smaller grain size than the second material when the second material is deposited.

2. The method of claim 1, wherein consolidating the second material comprises using one of hot isostatic pressing, hot pressing, electric current assisted sintering, cold isostatic pressing, dynamic consolidation, and magnetic compaction to consolidate the second material.

3. The method of claim 1, wherein operating the consolidating device further comprises consolidating the first material to form a lattice structure.

4. The method of claim 3, wherein depositing the first material and the third material onto a surface further comprises placing at least one mesh structure onto at least a portion of the first material and the third material.

5. The method of claim 1, wherein the operating the consolidating device of the additive manufacturing system comprises directing an energy beam to generate a melt pool in a powdered material.

6. The method of claim 5, wherein the powdered material comprises one or more of a metallic powder, a ceramic powder, a glass particle, or a polymer-based powder.

7. The method of claim 1, wherein the first material and the third material are alloy-steel.

8. The method of claim 7, wherein, as a result of the consolidation of the first material and the third material via the additive manufacturing system, the first material and third material comprise a first grain size.

9. The method of claim 8, wherein the second material comprises a consolidated grain size that is greater than or equal to the first grain size after the second material is consolidated.

10. The method of claim 1, wherein the second material comprises at least one of a cobalt alloy, a nickel alloy, and an iron alloy.

11. The method of claim 1, wherein the first process results in the first section including a plurality of voids after the first material is consolidated.

12. The method of claim 11, wherein the second material comprises a powder prior to consolidation that is deposited into the plurality of voids.

13. A method of fabricating a composite component, the method comprising:
    forming a powder bed of a powdered material on a surface of an additive manufacturing system;
    consolidating the powdered material using a first process facilitated by the additive manufacturing system to form a first section of the composite component and a third section of the composite component, wherein the first section comprising a plurality of first section unit cells joined together and the third section surrounds the first section;
    depositing a second material within the first section such that the second material surrounds the plurality of first section unit cells; and
    consolidating the second material using a second consolidation process different from the first process to form a second, solid section within the third section and within and surrounding each unit cell of the plurality of first section unit cells;
    wherein the third section includes a third material, the powdered material and the third material are harder than the second material, and the powdered material and the third material have a smaller grain size than the second material when the second material is deposited.

14. The method of claim 13, wherein consolidating the second material comprises using one of hot isostatic pressing, hot pressing, electric current assisted sintering, cold isostatic pressing, dynamic consolidation, and magnetic compaction to consolidate the second material.

15. The method of claim 13, wherein the first process comprises directing an energy beam to generate a melt pool in the powdered material.

16. The method of claim 15, wherein:
    the powdered material comprises alloy-steel, and
    wherein the second material comprises at least one of a cobalt alloy, a nickel alloy, and an iron alloy.

17. The method of claim 13, wherein:
    the first process results in the first section including a plurality of voids after the powdered material is consolidated, and
    the second material comprises a powder prior to consolidation that is deposited into the plurality of voids.

18. A method of fabricating a composite component, the composite component comprising a first material, a second material, and a third material, said method comprising:
    depositing the first material and the third material onto a surface of an additive manufacturing system; and
    operating an energy beam source of the additive manufacturing system to consolidate the first material and the third material using a first process to form:
        a first section comprising the first material, said first section comprising a plurality of first section unit cells joined together;
        a third section comprising the third material, said third section surrounding the first section; and
    depositing a second material within the first section such that the second material surrounds each unit cell of the plurality of first section unit cells; and
    consolidating the second material using a second consolidation process different from the first process to form a second section surrounding each unit cell of the plurality of first section unit cells;
    wherein the first material and the third material are harder than the second material, and the first material and the third material have a smaller grain size than the second material when the second material is deposited.

19. The method of claim 18, wherein consolidating the second material comprises using one of hot isostatic pressing, hot pressing, electric current assisted sintering, cold isostatic pressing, dynamic consolidation, and magnetic compaction to consolidate the second material.

20. The method of claim 18, further comprising consolidating the first material to form a lattice structure.

* * * * *